Patented June 24, 1930

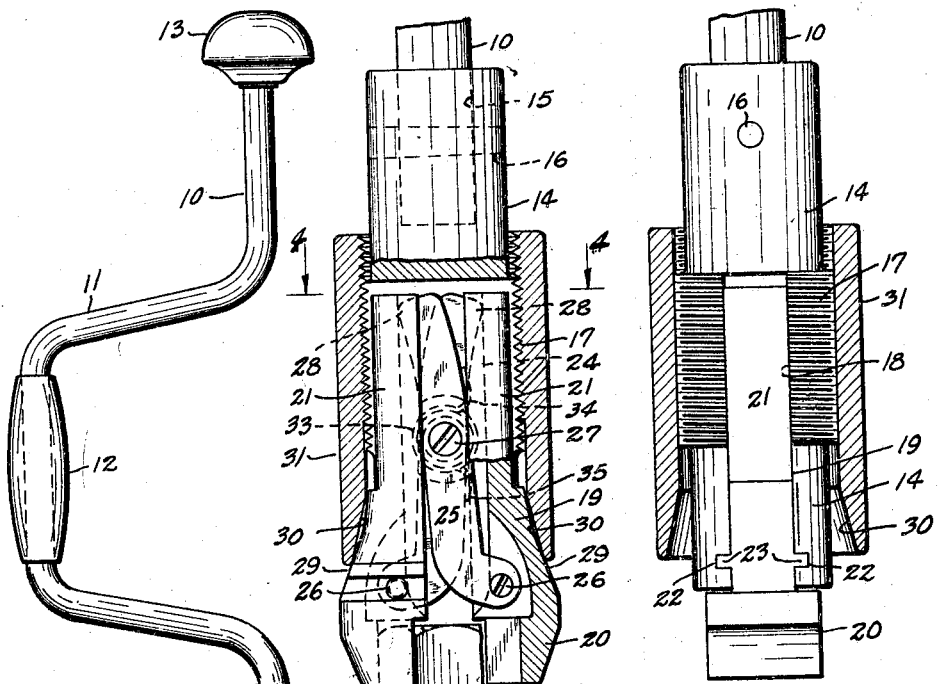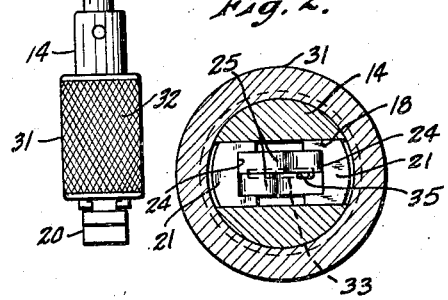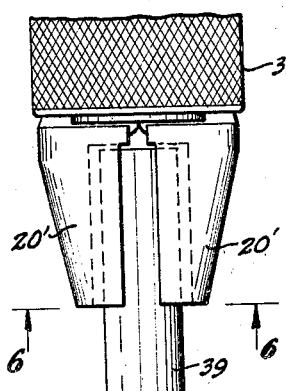

1,766,174

UNITED STATES PATENT OFFICE

WILLIS F. HOBBS AND JOHN A. ANDERSON, OF BRIDGEPORT, CONNECTICUT, ASSIGNORS TO THE BRIDGEPORT HARDWARE MANUFACTURING CORPORATION, OF BRIDGEPORT, CONNECTICUT, A CORPORATION OF CONNECTICUT

PARALLEL-JAW WRENCH OR BRACE

Application filed September 17, 1927. Serial No. 220,109.

This invention relates to a wrench or brace, and particularly to jaws and jaw operating mechanism for the same for gripping a nut or the shank of a tool, such as a bit, and has for an object to provide an improved jaw structure in which the jaws are adjustable for gripping different sizes of nuts or tool shanks and are easily and quickly clamped or released, and are so arranged that they are maintained always in substantially parallel relation so that they grip squarely on the nut for the entire height thereof, or if used for a bit or similar tool will grip squarely and uniformly along the length of the shank of the bit.

With the foregoing and other objects in view, we have devised the construction illustrated in the accompanying drawing forming a part of this specification. In this drawing, Fig. 1 is a side elevation of a frame or brace carrying our improved jaw structure.

Fig. 2 is a partial longitudinal section and partial side elevation showing our improved jaw construction on an enlarged scale.

Fig. 3 is a longitudinal section through the outer sleeve showing the jaw construction in elevation looking from the right of Fig. 2.

Fig. 4 is a transverse section substantially on line 4—4 of Fig. 2.

Fig. 5 is an end view of the jaw structure looking toward the bottom of Fig. 2.

Fig. 6 is a similar view showing the jaws of a slightly different shape for use as the jaws of a brace, and showing the shank of a tool in section, the section being substantially on line 6—6 of Fig. 7, and Fig. 7 is a side elevation of the jaws and shank in Fig. 6.

The operating frame or brace structure comprises the usual metal rod 10 having a central offset 11 forming a crank by which the frame may be rotated to rotate the jaws mounted at one end thereof, and thus operate a nut or tool. This offset carries the usual rotatable sleeve 12 forming a grip and the rotatable holding knob 13 at the opposite end. The jaw structure comprises a substantially cylindrical body member 14, and in the present construction has a recess 15 from one end to receive the end of the rod or frame 10 and to which it may be secured by any suitable means, such as a pin 16. This body is threaded on its outer surface, as shown at 17, and has a transverse slot 18 for the jaws 19. The jaws have heads or gripping portions 20 and extensions forming body or tail portions 21 of a thickness substantially the width of the slot 18, and the jaws are retained in the slot and prevented from falling out the open end thereof by coacting transverse slots and ribs 22 and 23 formed on the inner walls of the slot 18 and the outer side walls of the jaws respectively. These coacting slots and ribs prevent the jaws moving longitudinally in the body member but permit free lateral movement of the jaws toward and from each other. The extensions 21 of the jaws have longitudinal grooves 24 in their opposed surfaces, and between the jaws is a pair of levers 25. These levers are each pivoted at one end, as shown at 26, to one of the jaws, one to each jaw adjacent the head thereof. They are also pivoted together at substantially their mid length as shown at 27, and at their opposite ends have rounded portions 28 resting on the bottom of the grooves 24 so as to form a combination sliding and pivotal connection between the levers and the extensions of the jaws. This sliding engagement with the jaws permits relative longitudinal movement between the jaws and levers. The jaws have on their outer edges adjacent their heads inclined cam surfaces 29 which are adapted to cooperate with an inclined cam surface 30 on an internally threaded sleeve 31. This sleeve is threaded on the body member, and therefore, by rotation thereof will move longitudinally of this member. The outer surface of the sleeve may be knurled, as shown at 32, to give a better grip for operating the same. There is a coil spring 33 about the central pivot stud 27 and its opposite free ends 34 engage the respective levers and tend to swing them about their pivot to separate the jaws.

In the form shown in Figs. 1 to 5 the jaw heads have opposed V-shape recesses 36 to substantially fit and grip the opposite sides of a nut 37, while in the form shown in Figs. 6 and 7 the jaw heads 20' are somewhat longer than those shown in Figs. 1 to 5 and the recess 38 is somewhat differently shaped to adapt it to grip the shank 39 of a bit or other tool, but the operating mechanism of the jaws is exactly the same in both cases.

The operation is as follows: By rotating the sleeve 31 in the proper direction it will move longitudinally of the body member toward the heads of the jaws, and it is preferred that the threads 17 be left hand threads as with this arrangement the engagement of the sleeve with some outside element while tightening up the nuts, for example, is less likely to release the jaws. As the sleeve moves outwardly its cam surface 30 by engagement with the cam surfaces 29 on the jaws tends to force the jaws inwardly toward each other and clamp them on opposite sides of the nut 37, or the shank 39 of the tool if it is used in a brace. It will be obvious that inward pressure on the outer sides of the jaws combined with the outward pressure of the nut or shank being gripped will tend to hold the extensions 21 of the jaws against the inner ends 28 of the levers, and as the pivot 27 between the levers is at substantially their mid lengths their opposite ends move toward or from each other practically an equal amount during manipulation so that they always maintain the jaws in substantially parallel relation. It is, of course, understood that during adjusting movements of the jaws the rounded tails ends 28 of the levers slide along the bottoms of the grooves 24 in these levers. Therefore, as the jaws are always maintained in substantially parallel relation they will squarely and uniformly grip the nut or the shank for the entire length of the jaws, giving maximum gripping effect and one which is less likely to mar or break the nut or the shank because it is uniform throughout the length of the gripping surfaces. The spring 33 tends to rotate the levers about their connecting pivot 27 to separate the jaws, so that if the sleeve 31 is rotated in the opposite direction to move its cam surface 30 away from the cam surfaces 29 on the jaws, these cam surfaces will be maintained in engagement and the jaws opened under the action of the spring. This tool if used as a wrench is particularly adapted for a rim wrench for removing or securing the demountable rims of motor vehicles, but obviously is not limited to such use.

Having thus set forth the nature of our invention, what we claim is:

1. In a wrench or brace, a pair of jaws adapted to grip the opposite sides of an article to be rotated, a body member having a transverse slot in which the jaws are mounted for lateral movement toward and from each other, a pair of levers pivoted one to each jaw and to each other and having tail ends slidably engaging extensions of the jaws on the opposite side of the pivot between the levers from the pivotal connections to the jaws, a sleeve threaded to the outside of said body member, and coacting cam surfaces on the sleeve and the jaws.

2. In a wrench or brace, a body member having a transverse slot, a pair of gripping jaws mounted in the slot for lateral movement toward and from each other, a sleeve mounted on the body member for movement longitudinally thereof, coacting cam surfaces on the sleeve and the jaws, a pair of levers pivoted together intermediate their lengths and each associated with said jaws for rocking movement relative thereto at the opposite ends of said levers to maintain the jaws in substantially parallel relation.

3. In a wrench or brace, a body member having a transverse slot, a pair of jaws mounted in the slot, cooperating guide means on the body and jaws to retain the jaws against longitudinal movement in the slot and permit lateral movement of the jaws toward and from each other, means mounted on the body for operating the jaws, and means for maintaining the jaws in substantially parallel relation.

4. In a wrench or brace, a body member having a transverse slot, a pair of jaws mounted for lateral sliding movements in said slot, a pair of levers pivoted to each other intermediate their lengths and having pivotal connection with the respective jaws adjacent one end, said levers each associated with the respective jaws for sliding movement relative thereto at their opposite ends, and means mounted on the body and movable relatively thereto to operate the jaws and clamp them on an element.

5. In a wrench or brace, a body member having a transverse slot, a pair of jaws mounted for lateral sliding movements in said slot and having longitudinally extending grooves in their opposed sides, a pair of levers between the jaws and pivoted together intermediate their lengths, said levers being pivoted at one end to the respective jaws and at their opposite ends resting on the bottoms of the respective grooves, a sleeve embracing the body and jaws and threaded on the body, said jaws being provided with inclined cam surfaces, and the sleeve being provided with a camming surface cooperating with those on the jaws.

6. In a wrench or brace, a body member having a transverse slot, a pair of jaws mounted in the slot, cooperating guide means on the body and jaws to retain the jaws against longitudinal movement while permitting lateral movement toward and from each other, said jaws having inward extensions provided with longitudinal grooves on their opposed sides, a pair of levers between the jaws and pivotally connected intermediate their lengths, said levers being pivotally connected to the respective jaws adjacent one end and seating in the respective grooves for sliding connection with the jaws at their opposite ends, a sleeve embracing the body and jaws and threaded to the outside of the body, cooperating cam surfaces on the jaws and sleeve to clamp the jaws on an element, and a spring tending to separate the jaws.

In testimony whereof we affix our signatures.

WILLIS F. HOBBS.
JOHN A. ANDERSON.